T. CORESSEY (ALSO KNOWN AS T. N. KORESSIOS), DEC'D.
N. G. BALLEWITCH, EXECUTRIX.
DISTANCE MEASURING APPARATUS FOR VEHICLES.
APPLICATION FILED NOV. 30, 1921.
1,407,986.
Patented Feb. 28, 1922.
2 SHEETS—SHEET 1.
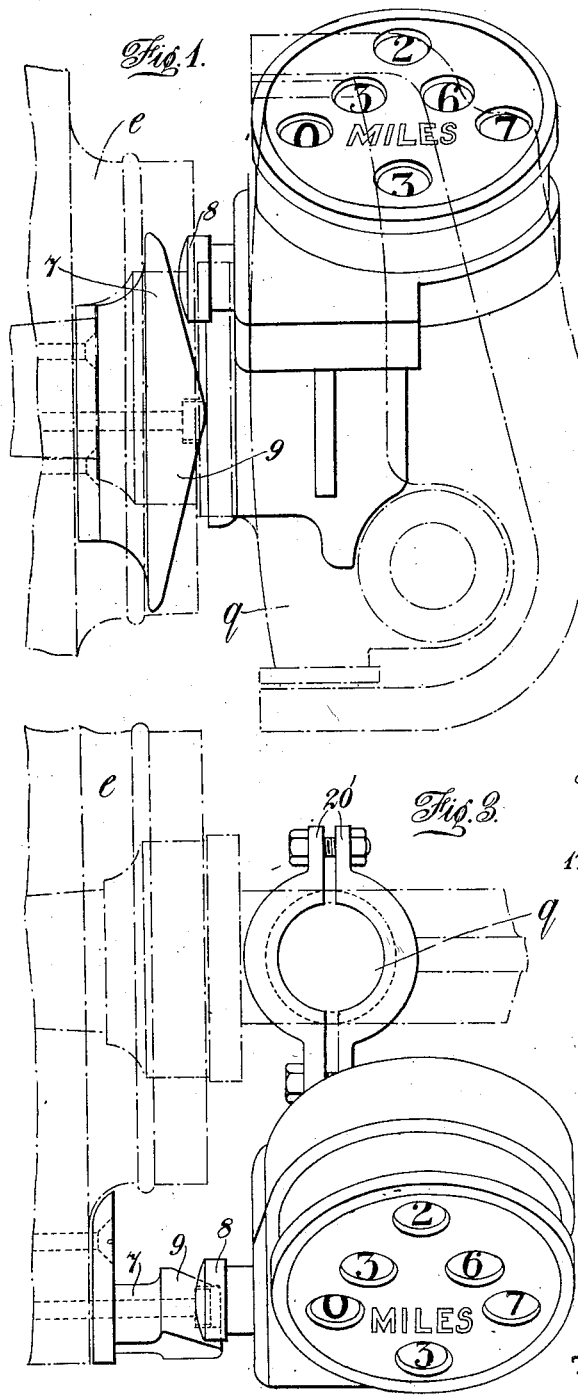
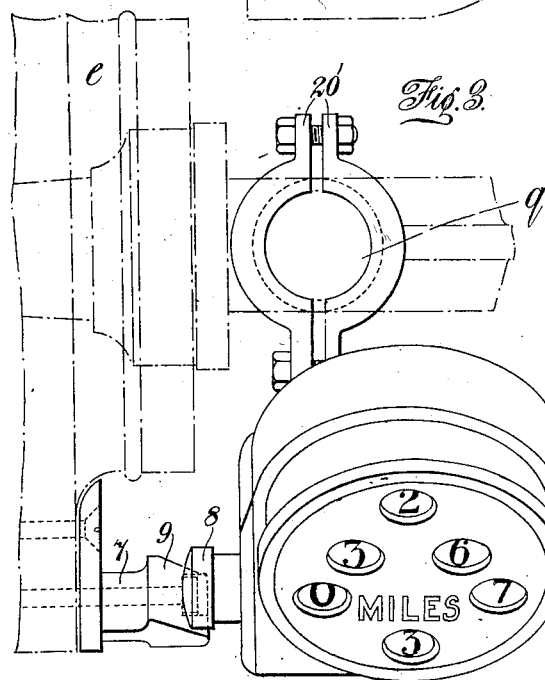
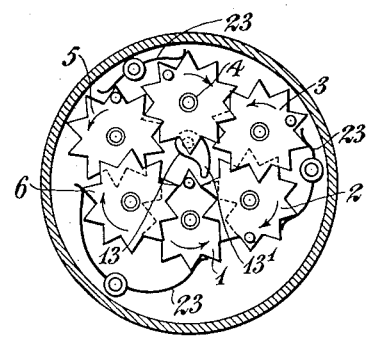
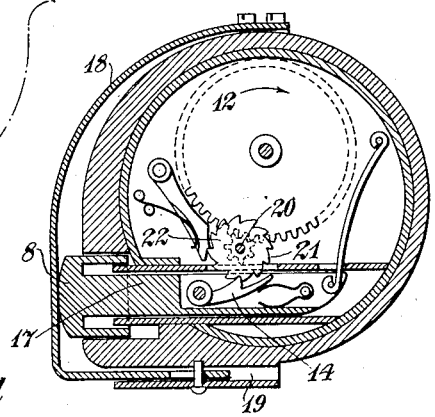
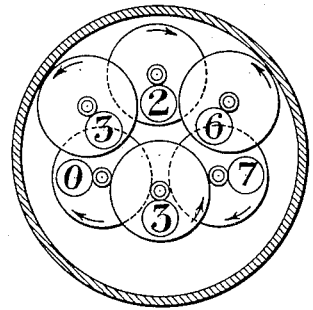
Theodore Coressey, Dec'd. — INVENTOR
By Nada G. Ballewitch,
EXECUTRIX
BY E. G. Siggers
ATTORNEY T. CORESSEY (ALSO KNOWN AS T. N. KORESSIOS), DEC'D.
N. G. BALLEWITCH, EXECUTRIX.
DISTANCE MEASURING APPARATUS FOR VEHICLES.
APPLICATION FILED NOV. 30, 1921.
1,407,986.
Patented Feb. 28, 1922.
2 SHEETS—SHEET 2.
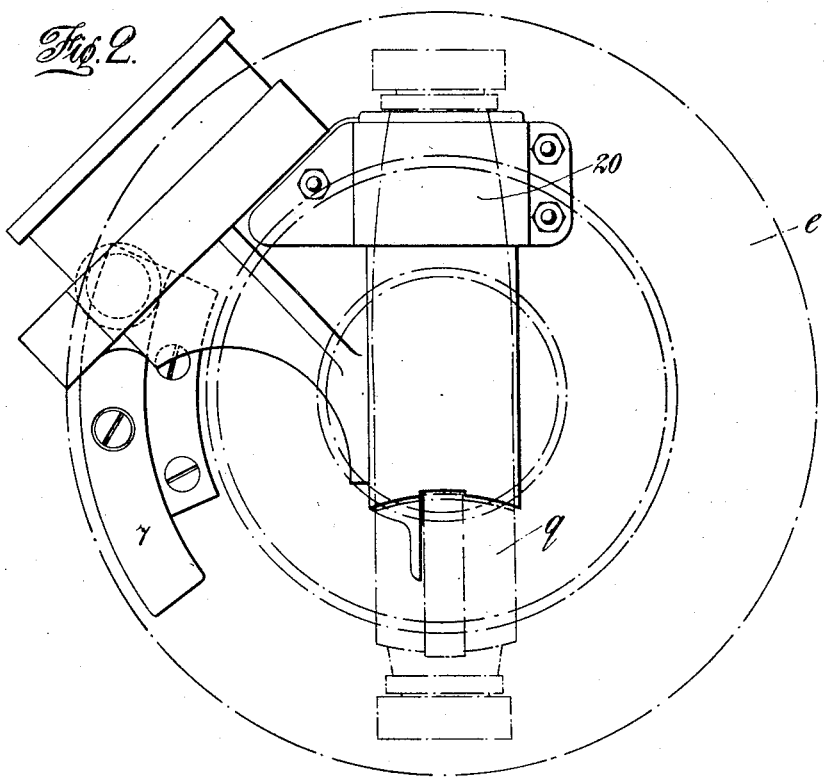
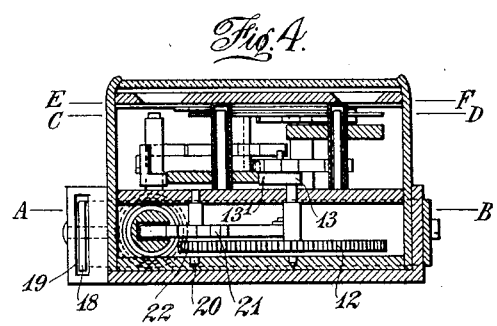
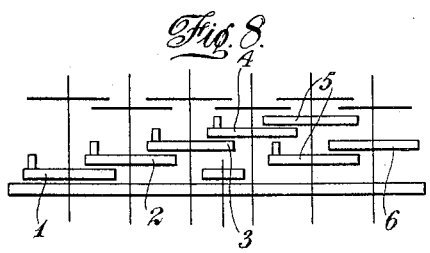
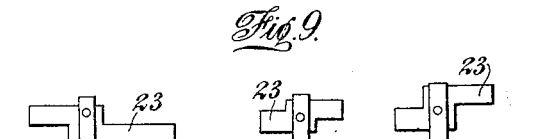
Theodore Coressey, Dec'd.—INVENTOR
BY Nada G. Ballewitch
EXECUTRIX

UNITED STATES PATENT OFFICE.

THEODORE CORESSEY, (ALSO KNOWN AS THEODORE NICHOLAS KORESSIOS,) DECEASED, LATE OF LONDON, ENGLAND, BY NADA GEORGE BALLEWITCH, EXECUTRIX, OF BARNES, ENGLAND.

DISTANCE-MEASURING APPARATUS FOR VEHICLES.

1,407,986.  Specification of Letters Patent.  Patented Feb. 28, 1922.

Application filed November 30, 1921. Serial No. 518,957.

*To all whom it may concern:*

Be it known that I, NADA GEORGE BALLEWITCH, a citizen of the Republic of Jugo-Slavia, and resident of Barnes, in the county of Surrey, Kingdom of England, am executrix of the last will and testament of THEODORE CORESSEY, also known as THEODORE NICHOLAS KORESSIOS, of London, England, late a subject of His Majesty the King of England, deceased, who has invented certain new and useful Improvements in Distance-Measuring Apparatus for Vehicles, of which the following is a specification.

This invention relates to distance measuring apparatus for road and other vehicles of the kind wherein a cam or like member secured to the road wheel is adapted at each revolution to contact with and actuate a spring controlled rod or plunger, said plunger being adapted to actuate a train of wheels by means of a pawl and ratchet, whereby the distance travelled will be indicated on a dial, the said several parts being disposed within a casing secured by clips or the like to the stub axle of the vehicle.

The object of this invention is to provide a measuring apparatus of improved construction.

According to this invention the measuring apparatus comprises in combination a wedge or cam secured to the side face of the hub of the road wheel, an indicating dial and mechanism secured by clips to a stub axle of the vehicle, a plunger or spindle associated with said mechanism and projecting into the path of the wedge or cam on the wheel so as to be actuated once for each revolution of the wheel, ratchet mechanism actuated by the plunger, a pinion and spur wheel actuated by the ratchet mechanism, an element carried by the spur wheel adapted to actuate one of a train of star wheels and an element on each star wheel adapted to partially rotate the adjacent star wheel to actuate indicating discs.

In order that the invention may be clearly understood and more readily carried into effect it is hereinafter described with reference to the accompanying drawings, in which:—

Figure 1 is a front view of an instrument according to this invention secured to the stub axle of the front road wheel of a motor road vehicle;

Figure 2 is a side elevation of said instrument showing its relation to the operating cam on the wheel;

Figure 3 is a plan view of said instrument corresponding to Figure 1;

Figure 4 is a sectional elevation of the instrument showing the general arrangement of the mechanism;

Figures 5, 6 and 7 are sectional views taken respectively on the lines A—B, C—D and E—F of Figure 4;

Figure 8 is an extended side elevation showing the arrangement of the star wheels and indicating discs, and Figure 9 is an extended side view showing the arrangement of the retaining springs around the side of the star wheels.

As shown and according to the present invention the apparatus comprises a spring controlled spindle or plunger 17 bearing on its outer end a wheel or head 8 and on the other end a pawl 14 which is in mesh with a ratchet wheel 21 bearing a suitable number of teeth, to suit the vehicle road wheel for which the particular instrument is designed. The spindle or plunger 17 is adapted to be operated once for each revolution of the road wheel in the manner hereinafter explained, and it will be seen that each time the said spindle 17 is pushed in against the action of the spring the pawl 14 carried thereby will advance the ratchet wheel 21 with which it engages, by one tooth. The spindle 20 on which the said ratchet wheel 21 is mounted also carries a pinion 22 with a similar number of teeth which is in mesh with a spur wheel 12 which in turn drives the chain of star wheels and indicating discs. On the hub $e$ of the wheel of the car is mounted a plate 7 which carries a special circular wedge or cam 9. The indicating instrument is secured to the stub axle $q$ of the car by means of suitable clips such as 20' so that the dial will face rearwardly at an angle and be in a convenient position for reading, and also so that the projecting end 8 of the spindle 17 will come in the path of the cam 9 and at each revolution of the wheel the wedge or cam will effect the operation of the spindle 17. If desired this projecting end of the spindle 17 may be protected by means of a suitable spring 18 as shown in Figure 5, one end of which is secured to the case of the instrument by screws and the other turned in so as to work in a slot 19. Thus at each revolution of the car wheel the wheels 21, 22 will be advanced by one tooth. The wheel 21 through the medium of the pinion 22, cog wheel 12, disc 13 carrying a pin 13', and the star wheels 1, 2, 3, 4, 5 and 6 will thus register on the dial of the instrument the distance in miles or other measure that the car runs.

The working of the distance measuring apparatus is performed in the ordinary manner; that is, the first star wheel 1 carries a pin which advances the next star wheel one notch or one tenth of a revolution each time it passes, and each star wheel in turn carries an indicating disc which is suitably marked with figures. Suitable springs such as 23 are provided for the purpose of retaining the star wheels in the positions to which they are moved.

What is claimed is:—

Distance measuring apparatus for motor road and other vehicles comprising in combination cam secured to the side face of the hub of the road wheel, an indicating dial and mechanism secured by clips to a stub axle of the vehicle and arranged to face rearwardly of the vehicle and at an incline to the horizontal, a plunger associated with said mechanism and projecting into the path of the cam on the wheel so as to be actuated once for each revolution of the wheel, ratchet mechanism actuated by the plunger, a pinion and spur wheel actuated by the ratchet mechanism, an element carried by the spur wheel adapted to actuate one of a train of star wheels, and an element on each star wheel adapted to partially rotate the adjacent star wheel to actuate indicating discs.

In testimony whereof I have hereunto signed my name.

NADA G. BALLEWITCH,
*Executrix of Theodore Coressey, also known as Theodore Nicholas Koressios, deceased.*